United States Patent
Hong et al.

(10) Patent No.: US 8,945,410 B2
(45) Date of Patent: *Feb. 3, 2015

(54) FUEL CELL WITH ENHANCED MASS TRANSFER CHARACTERISTICS

(75) Inventors: Bo Ki Hong, Seoul (KR); Sae Hoon Kim, Gyeonggi-do (KR); Kook Il Han, Seoul (KR); Kwang Ryeol Lee, Seoul (KR); Myoung Woon Moon, Seoul (KR)

(73) Assignees: Hyundai Motor Company, Seoul (KR); Korea Institute of Science and Technology, Seoul (KR)

( * ) Notice: Subject to any disclaimer, the term of this patent is extended or adjusted under 35 U.S.C. 154(b) by 52 days.

This patent is subject to a terminal disclaimer.

(21) Appl. No.: 13/526,875

(22) Filed: Jun. 19, 2012

(65) Prior Publication Data

US 2013/0089807 A1 Apr. 11, 2013

(30) Foreign Application Priority Data

Oct. 10, 2011 (KR) .................. 10-2011-0102843

(51) Int. Cl.
*B31D 3/00* (2006.01)
*B44C 1/22* (2006.01)
(Continued)

(52) U.S. Cl.
CPC .......... *H01M 4/8605* (2013.01); *H01M 8/1002* (2013.01); *H01M 8/1004* (2013.01);
(Continued)

(58) Field of Classification Search
USPC ......... 216/56, 67, 13; 977/778, 890; 429/535, 429/482
See application file for complete search history.

(56) References Cited

U.S. PATENT DOCUMENTS

| 5,879,827 A | 3/1999 | Debe et al. |
| 2005/0208366 A1* | 9/2005 | Rohwer et al. .................. 429/44 |

(Continued)

FOREIGN PATENT DOCUMENTS

| KR | 10-2006-0003003 | 1/2006 |
| KR | 10-0599805 | 5/2006 |

(Continued)

OTHER PUBLICATIONS

Park et al., "Adoption of nano-materials for the micro-layer in gas diffusion layers of PEMFCs", Journal of Power Sources, vol. 163, pp. 113-118 (2006).

*Primary Examiner* — Shamim Ahmed
(74) *Attorney, Agent, or Firm* — Edwards Wildman Palmer LLP; Peter F. Corless (57) ABSTRACT

Disclosed is a fuel cell with enhanced mass transfer characteristics in which a highly hydrophobic porous medium, which is prepared by forming a micro-nano dual structure in which nanometer-scale protrusions with a high aspect ratio are formed on the surface of a porous medium with a micrometer-scale roughness by plasma etching and then by depositing a hydrophobic thin film thereon, is used as a gas diffusion layer, thereby increasing hydrophobicity due to the micro-nano dual structure and the hydrophobic thin film. When this highly hydrophobic porous medium is used as a gas diffusion layer for a fuel cell, it is possible to reduce water flooding by efficiently discharging water produced by an electrochemical reaction of the fuel cell and to improve the performance of the fuel cell by facilitating the supply of reactant gases such as hydrogen and air (oxygen) to a membrane-electrode assembly (MEA).

18 Claims, 7 Drawing Sheets

(51) Int. Cl.
   *H01M 4/86* (2006.01)
   *H01M 8/10* (2006.01)
   *H01M 4/88* (2006.01)

(52) U.S. Cl.
   CPC .......... *H01M4/8807* (2013.01); *H01M 4/8817* (2013.01); *H01M 4/8821* (2013.01); *H01M 4/886* (2013.01); *Y02E 60/521* (2013.01); *Y10S 977/778* (2013.01); *Y10S 977/89* (2013.01)
   USPC ................. 216/56; 216/13; 216/67; 429/482; 429/535; 977/778; 977/890

(56) References Cited

U.S. PATENT DOCUMENTS

| | | |
|---|---|---|
| 2005/0233203 A1 | 10/2005 | Hampden-Smith et al. |
| 2007/0003084 A1* | 1/2007 | Huynh et al. ............. 381/323 |
| 2008/0210664 A1* | 9/2008 | Uenishi et al. ............ 216/67 |
| 2010/0099005 A1* | 4/2010 | Ren et al. ................. 429/34 |
| 2010/0145286 A1* | 6/2010 | Zhang et al. ............. 604/265 |
| 2011/0136044 A1* | 6/2011 | Han et al. ................. 429/518 |
| 2012/0009495 A1* | 1/2012 | Cha et al. ................. 429/454 |
| 2012/0276335 A1* | 11/2012 | Hong et al. ............. 428/143 |

FOREIGN PATENT DOCUMENTS

| | | |
|---|---|---|
| KR | 10-2007-0095055 | 9/2007 |
| KR | 10-2007-0099935 | 10/2007 |
| KR | 10-0814844 | 3/2008 |
| KR | 10-2009-0027527 | 3/2009 |
| KR | 10-2009-0078660 | 7/2009 |
| KR | 10-2009-0130566 | 12/2009 |
| WO | 2008145145 A1 | 12/2008 |

* cited by examiner

FUEL CELL WITH ENHANCED MASS TRANSFER CHARACTERISTICS

CROSS-REFERENCE TO RELATED APPLICATION

This application claims under 35 U.S.C. §119(a) the benefit of Korean Patent Application No. 10-2011-0102843 filed Oct. 10, 2011, the entire contents of which are incorporated herein by reference.

BACKGROUND (a) Technical Field

The present invention relates to a fuel cell and a method for manufacturing the same. More particularly, it relates to a fuel cell with enhanced mass transfer characteristics and a method for manufacturing the same, which can reduce water flooding by efficiently discharging water produced by an electrochemical reaction using a highly hydrophobic gas diffusion layer having a new surface structure and can improve cell performance in a high power density region and in an abnormal operating condition by facilitating the supply of reactant gases such as hydrogen and air (oxygen) to a membrane-electrode assembly.

(b) Background Art

Typically, one of the most attractive fuel cells for a vehicle is a polymer electrolyte membrane fuel cell (PEMFC) manufactured by stacking several hundreds of unit cells into a stack. In order to mount the PEMFC in a vehicle for use of transport, the PEMFC should exhibit a high power performance of several tens of kW or higher under various operating conditions and, to this end, should be able to stably operate in a wide current density range.

The electrochemical reaction for electricity generation of the PEMFC will be described below. Hydrogen supplied to an anode as an oxidation electrode in a membrane electrode assembly (MEA) of the fuel cell is dissociated into hydrogen ions (protons) and electrons. The hydrogen ions are transmitted to a cathode as a reduction electrode through a polymer electrolyte membrane, and the electrons are transmitted to the cathode through an external circuit so that electricity is generated by the flow of electrons. Moreover, at the cathode, the protons, electrons and oxygen molecules react with each other to produce electricity and heat and, at the same time, produce water as a reaction by-product.

The area expressing the electrochemical performance of the fuel cell is generally classified into three regions: (i) an "activation loss" region due to loss of electrochemical reaction kinetics; (ii) an "ohmic loss" region due to contact resistance at interfaces between respective components and loss of ionic conduction in the polymer electrolyte membrane; and (iii) a "mass transport or transfer loss" or "concentration loss" region due to the limitations of mass transport of reactant gases [See R. O Hayre, S. Cha, W. Colella, F. B. Prinz, *Fuel Cell Fundamentals*, Ch. 1, John Wiley & Sons, New York (2006), which is hereby incorporated by reference].

When an appropriate amount of water produced during the electrochemical reaction is present, it preferably serves to maintain the humidity of the polymer electrolyte membrane. However, when an excessive amount of water produced is not appropriately removed, "flooding" occurs at a high current density, preventing the reactant gases from being efficiently supplied to the fuel cell and thereby increasing voltage loss [See M. M. Saleh, T. Okajima, M. Hayase, F. Kitamura, T. Ohsaka, *J. Power Sources*, 167, 503 (2007), which is hereby incorporated by reference].

Recently, with the commercialization of the fuel cell, extensive research and development of gas diffusion layers as a key component of water management in the fuel cell has continued to progress. A gas diffusion layer which is typically included in the fuel cell will be described in detail below.

A typical porous medium that constitutes the fuel cell is a gas diffusion layer (GDL), which is composed of both a microporous layer (MPL) and a macroporous substrate or backing.

At present, commercially available gas diffusion layers have a dual layer structure including a microporous layer (MPL) having a pore size below 1 micrometer when measured by mercury intrusion and a macroporous substrate or backing having a pore size of 1 to 300 micrometers [See, X. L. Wang, H. M. Zhang, J. L. Zhang, H. F. Xu, Z. Q. Tian, J. Chen, H. X. Zhong, Y. M. Liang, and B. L. Yi, *Electrochimica Acta*, 51, 4909 (2006) which is hereby incorporated by reference].

The gas diffusion layer is attached to the outer surface of each of catalyst layers for the anode and cathode coated on both surfaces of the polymer electrolyte membrane in the fuel cell. The gas diffusion layer functions to supply reactant gases such as hydrogen and air (oxygen), transmit electrons produced by the electrochemical reaction, and discharge water produced by the reaction to minimize the flooding phenomenon in the fuel cell [See L. Cindrella, A. M. Kannan, J. F. Lin, K. Saminathan, Y. Ho, C. W. Lin, J. Wertz, *J. Power Sources*, 194, 146 (2009); and X. L. Wang, H. M. Zhang, J. L. Zhang, H. F. Xu, Z. Q. Tian, J. Chen, H. X. Zhong, Y. M. Liang, B. L. Yi, *Electrochim. Acta*, 51, 4909 (2006) which are both hereby incorporated by reference].

Typically, the microporous layer of the gas diffusion layer may be formed by preparing a mixture of carbon black powder such as acetylene black carbon, black pearl carbon, etc. and a hydrophobic agent such as polytetrafluoroethylene (PTFE) or fluorinated ethylene propylene (FEP). The mixture can be coated on one or both sides of the macroporous substrate.

The macroporous substrate of the gas diffusion layer is generally composed of carbon fiber and a hydrophobic agent such as polytetrafluoroethylene and fluorinated ethylene propylene [See, C. Lim and C. Y. Wang, *Electrochim. Acta*, 49, 4149 (2004)] and may be broadly classified into carbon fiber felt, carbon fiber paper, and carbon fiber cloth [S. Escribano, J. Blachot, J. Etheve, A. Morin, R. Mosdale, *J. Power Sources*, 156, 8 (2006); M. F. Mathias, J. Roth, J. Fleming, and W. Lehnert, *Handbook of Fuel Cells-Fundamentals, Technology and Applications*, Vol. 3, Ch. 42, John Wiley & Sons (2003) which are both hereby incorporated by reference].

It is necessary to optimize the structural design of the gas diffusion layer for the fuel cell such that the gas diffusion layer provides appropriate performance according to its application fields, such as transportation, portable, and residential power generation devices, and the fuel cell operational conditions. In general, in the formation of the gas diffusion layer for a fuel cell vehicle, the carbon fiber felt or carbon fiber paper is preferred to the carbon fiber cloth since the carbon fiber felt and carbon fiber paper have excellent properties such as reactant gas supply properties, product water discharge properties, compression properties, and handling properties.

Moreover, the gas diffusion layer has a significant effect on the performance of the fuel cell according to complex and various structural differences such as the thickness, gas permeability, compressibility, hydrophobicity of microporous layer and macroporous substrate, carbon fiber structure, porosity/pore size distribution, pore tortuosity, electrical resistance, bending stiffness, etc. Especially, it is known that there is a significant difference in performance in the mass transport region [See D. H. Ahmed, H. J. Sung, and J. Bae, *Int. J. Hydrogen Energy,* 33, 3767 (2008); and Y. Wang, C. Y. Wang, and K. S. Chen, *Electrochim. Acta,* 52, 3965 (2007); and C. J. Bapat and S. T. Thynell, *J. Power Sources,* 185, 428 (2008); which are hereby incorporated by reference].

In particular, in order to increase the mass transfer characteristics and maintain high cell performance by effectively removing the water produced during the electrochemical reaction of the fuel cell, it is very important to impart hydrophobicity to the microporous layer and the macroporous substrate by appropriately introducing a hydrophobic agent such as polytetrafluoroethylene (PTFE) into them [See S. Park, J.-W. Lee, B. N. Popov, *J. Power Sources,* 177, 457 (2008); and G.-G. Park. Y.-J. Sohn, T.-H. Yang, Y.-G. Yoon, W.-Y. Lee, C.-S. Kim, *J. Power Sources,* 131, 182 (2004) which are hereby incorporated by reference].

However, a wet chemical process has conventionally been used to impart hydrophobicity, and thus the manufacturing process itself is complicated and it is difficult to uniformly distribute the hydrophobic agent such as PTTE on the gas diffusion layer.

Moreover, according to the conventional process for manufacturing the gas diffusion layer, it is difficult to further impart high hydrophobicity or super-hydrophobicity corresponding to a contact angle (static constant angle) of 150° or higher to a porous medium which have already been subjected to waterproof treatment.

In conventional studies, there are various attempts to impart hydrophilicity to the surface of the porous medium using various plasma processes such as oxygen, nitrogen, ammonia, silane ($SiH_4$), organometallics, etc., which, however, are different from the object of the present invention to impart high hydrophobicity to the porous medium.

In addition, there are attempts to employ plasma surface treatment techniques during the formation of the electrodes of the MEA, which, however, relate to a process for forming a catalyst layer comprising catalyst and binder. That is, these methods are to chemically form a hydrophilic or hydrophobic surface by modifying the surface of the catalyst layer using plasma techniques, and with these methods, it is very difficult to form high hydrophobicity on the surface of the porous medium.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a fuel cell with enhanced mass transfer characteristics and a method for manufacturing the same, which can reduce water flooding by efficiently discharging water produced by an electrochemical reaction using a highly hydrophobic gas diffusion layer having a new surface structure and can improve cell performance in a high power density region and in an abnormal operating condition by facilitating the supply of reactant gases such as hydrogen and air (oxygen) to a membrane-electrode assembly.

In one aspect, the present invention provides a fuel cell with enhanced mass transfer characteristics, the fuel cell comprising a membrane-electrode assembly, a gas diffusion layer as a porous medium, and a separator having flow fields of reactant gases, which are stacked to form a unit cell. The gas diffusion layer may include a micro-nano dual structure, in which nanometer-scale protrusions or collapsed pores are formed on the surface of the porous medium with a micrometer-scale surface roughness, and a hydrophobic thin film deposited on the surface of the micro-nano dual structure.

In another aspect, the present invention provides a method of manufacturing a fuel cell with enhanced mass transfer characteristics. In particular, this method provides a porous medium with a micrometer-scale surface roughness; forming a micro-nano dual structure on the surface of the porous medium by forming nanometer-scale protrusions or collapsed pores by plasma etching; depositing a hydrophobic thin film on the surface of the micro-nano dual structure; and forming a fuel cell together with a -membrane-electrode assembly and a separator using the porous medium including the micro-nano dual structure and the hydrophobic thin film as a gas diffusion layer.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying to drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or to groups thereof. As used herein, the term "and/or" includes any and all combinations of one or more of the associated listed items.

The above and other features of the invention are discussed infra.

The present invention provides a fuel cell with enhanced mass transfer characteristics and a method for manufacturing the same, in which a highly hydrophobic gas diffusion layer having a porous surface with enhanced hydrophobicity is used. In particular, the highly hydrophobic gas diffusion layer of the present invention has a surface with a micro-nano dual structure in which nanometer-scale protrusions or collapsed pores are formed on the surface of a porous medium with a micrometer-scale roughness (a macroporous substrate, which will be described later, has a micrometer-scale surface roughness) and, at the same time, a hydrophobic thin film is deposited on the surface of the micro-nano dual structure, thereby increasing hydrophobicity due to the micro-nano dual structure and the hydrophobic thin film.

In the following, the micro-nano dual structure represents a composite structure comprising microstructures and nanostructures in which nanoprotrusions or collapsed nanopores are artificially formed by plasma etching on the surface of the porous medium with an intrinsic micrometer-scale roughness.

Since the macroporous substrate has a micrometer-scale surface roughness, the micrometer-scale surface protrusions or collapsed pores thereof form the micro-nano dual structure together with the artificially formed nanoprotrusions or nanopores.

Carbon particles of the microporous layer also have a fine surface roughness, and thus when the nanostructures such as nanoprotrusions or nanopores are formed on the microporous layer by plasma etching, the nanostructures by the plasma etching form a dual structure on the microporous layer together with the surface roughness of the carbon particles.

The surface roughness is given by the nanoprotrusions or collapsed nanopores formed on the surface of the material for the porous medium (corresponding to the carbon particles of the microporous layer or carbon fibers of the macroporous substrate).

As a result, the highly hydrophobic gas diffusion layer with the micro-nano dual structure of the present invention has features that the wettability on both (outer) surfaces is significantly lower than that of the conventional gas diffusion layers and the contact angle (i.e., static contact angle) of a fluid such as pure water on the surface of the gas diffusion layer is about 150° or higher, which will be described in detail later.

Moreover, to overcome the difficulties in achieving high hydrophobicity in the conventional process for forming the gas diffusion layer, highly hydrophobic properties are imparted to the surface of the gas diffusion layer (i.e., the surfaces of the microporous layer and the macroporous substrate) by both structural and chemical modifications in the manufacturing process of the present invention, in which a process for optimizing the nanostructures with a high aspect ratio on the surface of the gas diffusion layer, a process for structurally modifying the surface having a micro-nano dual roughness structure, and a chemical modification process for forming a chemically hydrophobic surface by depositing a hydrophobic thin film are performed in combination.

The inventor of the present invention has experimentally found that when dry plasma treatment (i.e., plasma etching) is performed on the gas diffusion layer, nanoprotrusions or nanopores are formed (by the plasma etching) and combined with the surface of the gas diffusion layer with a micrometer-scale surface roughness to form a micro-nano dual structure, that when a hydrophobic carbon thin film is formed on the surface of the micro-nano dual structure by plasma deposition, for example, the hydrophobicity of the gas diffusion layer can significantly increase, and that when the highly hydrophobic gas diffusion layer is used in the fuel cell, the cell performance is improved, and completed the present invention. As a result, the highly hydrophobic gas diffusion layer can be effectively used as the gas diffusion layer for the fuel cell and can efficiently discharge water produced during the electrochemical reaction of the fuel cell.

In the process of modifying the surface of the gas diffusion layer by the plasma treatment of the present invention, the nanostructures are formed by etching the surface of the gas diffusion layer using argon (Ar) or oxygen ($O_2$) plasma to provide a structure that can minimize the contact surface with respect to a fluid such as water, and the hydrophobic thin film (e.g., hydrophobic carbon thin film) is deposited on the surface of the resulting structure. In this case, it is possible to impart high hydrophobicity or super-hydrophobicity corresponding to a contact angle of about 150° or higher with respect to a fluid such as pure water. That is, only with the dry plasma treatment, the structural and chemical modifications are possible on the surface of the gas diffusion layer, and thus it is possible to easily impart high hydrophobicity suitable for the fuel cell.

A better understanding of the increased hydrophobicity on the surface of the gas diffusion layer can be achieved by understanding the mechanism of high hydrophobicity or super-hydrophobicity on a solid surface as described below.

The hydrophobicity of the solid surface depends on chemical properties of the solid surface, but when a fine pattern is formed on the solid surface, the hydrophobicity significantly increases such that the solid surface has super-hydrophobicity. For example, the contact angle of the surface having a fine protrusion or pore structure with respect to water is increased to about 150° to 170° to impart super-hydrophobicity, compared to a flat surface which has been subjected to the same chemical treatment.

At the same time, the surface having the protrusion or pore structure can have a self-cleaning function, which allows a droplet on the solid surface to be readily removed under conditions where the contact angle hysteresis is reduced to less than about 10°. Therefore, in order to form a highly hydrophobic or super-hydrophobic surface, a surface layer having low surface energy should be formed and, at the same time, the surface layer should have a physical/structural surface roughness.

In the case of the surface roughness, the size distribution of fine protrusions or pores plays a very important role, and the surface roughness of collapsed pores also exhibits the same properties as the surface roughness of fine protrusions. Especially, when the chemical composition of the surface is controlled while the nanometer-scale pores and micrometer-scale pores are present together, a hydrophobic surface and, further, a super-hydrophobic surface can be achieved.

Therefore, in the present invention, the target high hydrophobicity is achieved by applying a mechanism for increasing the hydrophobicity, which can be obtained when the above-described physical structure (i.e., the micro-nano complex structure) and chemical properties are combined together at the surface of the gas diffusion layer.

That is, the highly hydrophobic surface can be obtained by forming a nano-roughness pattern by plasma etching and forming a hydrophobic thin film by plasma deposition on the surfaces of the microporous layer and the macroporous substrate, which constitute the gas diffusion layer of the fuel cell. Moreover, it is possible to impart high hydrophobicity to the surface of the gas diffusion layer by simultaneously performing structural and chemical controls on the surface properties of the gas diffusion layer.

Moreover, in the exemplary embodiment of the present invention, it is possible to minimize side effects such as an increase in electrical resistance on the surface of the gas diffusion layer by optimizing the conditions for forming the micro-nano dual structure on the gas diffusion layer (i.e., plasma etching conditions) and the conditions for hydrophobic thin film coating and to increase the mass transfer characteristics in the fuel cell and the cell performance by increasing the surface hydrophobicity.

Figure 1:
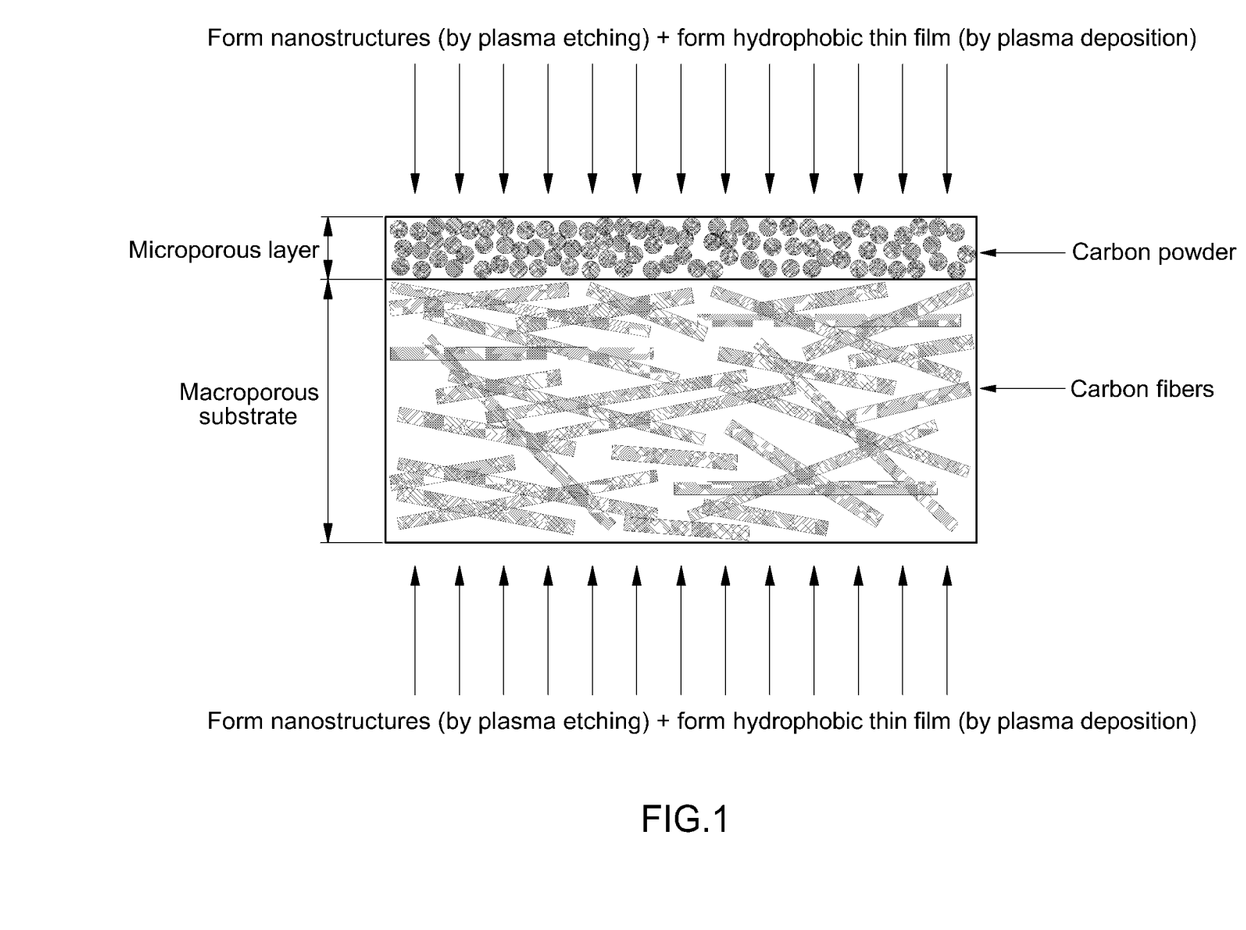
FIG. 1 is a schematic diagram illustrating a process of forming a micro-nano complex (dual) structure by performing plasma etching on the surfaces of a microporous layer and a macroporous substrate and imparting high hydrophobicity by performing hydrophobic treatment on the resulting surfaces.

Next, the present invention will be described in more detail with reference to the to drawings. FIG. 1 is a schematic diagram illustrating a process of forming a micro-nano complex structure by performing plasma etching on the surfaces of a gas diffusion layer according to an exemplary embodiment of the present invention. That is, FIG. 1 schematically shows a microporous layer and a macroporous substrate, which constitute the gas diffusion layer for the fuel cell, and shows a surface modification method for the gas diffusion layer.

In the fuel cell of the present invention, the highly hydrophobic gas diffusion layer includes nanostructures with a high aspect ratio and a hydrophobic thin film, which are provided on the surfaces of the microporous layer and the macroporous substrate.

As shown in FIG. 1, the plasma etching for the micro-nano dual structure is performed on the surface of the microporous layer and the surface of the macroporous substrate, respectively, to form nanostructures with a high aspect ratio, and a hydrophobic thin film is formed on the micro-nano dual structure by plasma deposition, thereby forming a gas diffusion layer with a highly hydrophobic surface.

In the present invention, the plasma etching is performed on each surface of the gas diffusion layer having the above-described structure, in which the microporous layer and the macroporous substrate are combined together (see FIG. 1), to form nanoprotrusions or nanopores on the surface of carbon materials (such as carbon particles and carbon fibers), which constitute the surfaces of the microporous layer and the macroporous substrate (i.e., the surface of the gas diffusion layer).

In an exemplary embodiment, nanoprotrusions or nanopores having a width of about to 1 to 100 nanometers, a length of about 1 to 1,000 nanometers, and thus an aspect ratio of about 1 to 10 may be preferably formed on the surface of the carbon materials on the surfaces of the microporous layer and the macroporous substrate by plasma etching.

Here, for example, when the aspect ratio is less than 1, the surface roughness effect is not fully established, whereas, when the aspect ratio is greater than 10, the structure of the nano-pattern is not stably maintained.

In the microporous layer of the gas diffusion layer, the carbon particles having non-uniform diameters form aggregates and thus are present in the range of several tens of nanometers to several micrometers in diameter.

When the plasma etching is performed on the microporous layer, the surfaces of spherical carbon particles are etched to form sharp carbon particles having a width of several nanometers, and then the hydrophobic thin film is deposited on the surface of the resulting microporous layer.

Moreover, it is preferred to form nanoprotrusions or nanopores having a width of about 10 to 30 nanometers, a length of about 10 to 200 nanometers, and thus an aspect ratio of 1 to 7 on the surface of carbon fibers having a diameter of about 5 to 20 micrometers of the macroporous substrate by plasma etching. These nanoprotrusions form a nano-pattern with a high aspect ratio, thus providing the micro-nano dual structure.

The surface with the micro-nano dual structure has super-hydrophobic and self-cleaning properties.

The hydrophobic thin film for increasing the hydrophobicity may be a hydrocarbon thin film comprising silicon (Si) and oxygen or a hydrocarbon thin film comprising fluorine (F), and the hydrophobic thin film may have a thickness in the range of about 0.1 to 90 nanometers since the thickness of the hydrophobic thin film may have a significant effect on the performance of the fuel cell.

Here, when the thickness of the hydrophobic thin film is less than 0.1 nanometers, the effect of increasing the hydrophobicity of the gas diffusion layer cannot be obtained, whereas, when it exceeds 90 nanometers, the electrical resistance of the gas diffusion layer may increase significantly. Therefore, it is preferable that the hydrophobic thin film has a thickness in the range of about 0.1 to 90 nanometers. In this thickness range of the hydrophobic thin film, the electrical resistance may be maintained below about 12 mΩcm² at a compression pressure of about 1 MPa as will be described later.

Especially, for use as the gas diffusion layer of the fuel cell, it is necessary to properly adjust the thickness of the hydrophobic thin film so as not to clog the pores without increasing the intrinsic electrical resistance of the gas diffusion layer.

The hydrocarbon material comprising silicon and oxygen may be deposited using hexamethyldisiloxane (HMDSO) as a precursor, and the hydrophobicity may be controlled by appropriately mixing hexamethyldisiloxane and argon gas (e.g., less than about 30% volume fraction).

The contact angle on the surfaces of the microporous layer and the macroporous substrate in the gas diffusion layer whose hydrophobicity is increased by the above-described to plasma treatment (for the formation of the nanostructures by plasma etching and the formation of the hydrophobic thin film by plasma deposition) is about 150° or higher.

Since the nanometer-scale patterns and the micrometer-scale patterns are mixed with PTFE as a hydrophobic polymer on the surfaces of the microporous layer and the macroporous substrate, which constitute the gas diffusion layer, the contact angle is about 135 to 145°.

However, in the present invention, it is easy to form the microporous layer and the macroporous substrate having a surface contact angle of about 150° or higher by forming a nanostructure surface on the gas diffusion layer by simple dry plasma treatment and forming a hydrophobic thin film on the surface of the gas diffusion layer by hydrophobic thin film coating. Especially, even the surface which is free from PTFE can have high hydrophobicity corresponding to a contact angle of about 150° or higher.

The reason for this is that the size of the nano-pattern with a high aspect ratio formed by plasma etching is significantly reduced, which increases the surface roughness, and the micro-nano dual structure is formed on the surface of the gas diffusion layer. Thus, it is possible to obtain a contact angle of about 150° or higher, thereby obtaining highly hydrophobic surface properties. Moreover, the hydrophobic thin film is uniformly deposited on the surface such that the surface energy is generally low, and thus a uniform, highly hydrophobic surface can be obtained.

The hydrophobic agent such as PTFE introduced into the microporous layer and the macroporous substrate of the commercially available gas diffusion layer is difficult to be uniformly introduced into the surface and the inside, and a complex wet-forming process should be used. Moreover, it is difficult to increase the contact angle of the surface of the gas diffusion layer above about 150°.

The process for forming the above-described highly hydrophobic gas diffusion layer of the present invention comprises: (a) providing a gas diffusion layer comprising only a macroporous substrate or both a macroporous substrate and a microporous layer which are combined together; (b) forming nanostructures in the form of nanoprotrusions with a high aspect ratio or collapsed nanopores on the surface of carbon materials of the gas diffusion layer; and (c) depositing a hydrophobic thin film on the surface of the gas diffusion layer on which the nanostructures are formed.

As shown in FIG. 1, step (a) is to provide a gas diffusion layer comprising only a macroporous substrate or both a macroporous substrate and a microporous layer which are combined together, and this process for forming the gas diffusion layer is well known in the art. In an exemplary embodiment, a commercially available gas diffusion layer that is composed of both the microporous layer and the macroporous substrate, may be used.

Step (b) is to form nanostructures with a high aspect ratio by performing plasma etching on both sides of the gas diffusion layer comprising the microporous layer and the macroporous substrate on which the nanoscale and microscale surfaces are formed. The plasma etching may be plasma-enhanced chemical vapor deposition (PECVD) or plasma-assisted chemical vapor deposition (PACVD) and may use $O_2$, Ar, $N_2$, He, $CF_4$, $CHF_3$, $C_2F_6$, HF, or $SiF_4$.

Moreover, in addition to the chemical vapor depositions (CVDs), the etching can be performed by one or a combination of ion beam, hybrid plasma chemical vapor deposition (HPCVD), and atmospheric plasma.

When the plasma etching is performed, a large number of nanoprotrusions with a high aspect ratio are formed, and the size of the nano-pattern after etching is reduced compared to before the etching, which makes the surface rougher.

The oxygen plasma reacts with the carbon materials to etch the carbon particles on the surface of the microporous layer and the carbon fibers on the surface of the macroporous substrate. At this time, the carbon materials are bonded with oxygen plasma to form $CO_2$ or CO, and thus the surface is etched.

In the plasma etching process of the present invention, the size and shape of the nanostructures with a high aspect ratio can be controlled by adjusting at least one of the etching pressure, acceleration voltage, and etching time (i.e., plasma treatment time). Preferably, the etching pressure is 1 Pa to 10 Pa and the acceleration voltage is −100 Vb to −1,000 Vb.

When the etching pressure is less than 1 Pa, the formation rate of the surface roughness pattern is too low to effectively form the pattern, whereas, when it exceeds 10 Pa, the formation rate of the surface roughness pattern is too high to form a stable pattern.

Moreover, when the acceleration voltage is less than about −100 Vb, the plasma cannot be efficiently generated, whereas, when it exceeds about −1,000 Vb, the plasma generation process cannot be stably maintained.

Further, since the formation of nanostructures on the surface according to the plasma etching time may have a significant effect on the performance of the fuel cell, it is important to perform the plasma irradiation for an optimum time, and thus the plasma etching is preferably performed for about 0.1 to 60 minutes.

When the plasma etching time is less than about 0.1 minutes, the etching effect is too small to allow the nanostructures to develop, whereas, when it exceeds about 60 minutes, it is difficult to control the surface shape of desired nanostructures due to excessive etching, and further the cycle of the surface treatment is too long, thus reducing the productivity.

Step (c) is to deposit a hydrophobic thin film on the surface of the gas diffusion layer on which a complex pore structure comprising micropores and nanopores is formed. To deposit the hydrophobic thin film, a mixed gas of argon in a partial pressure about 0 to 30 vol % and hexamethyldisiloxane or hexamethyldisiloxane gas may be used.

However, the present invention is not limited to the deposition of the hydrophobic thin film but includes various film deposition methods. The surface properties of the hydrophobic carbon thin film for increasing the hydrophobicity depend on a radio frequency (RF) power supply in a PECVD apparatus and an argon fraction in a precursor gas. Therefore, when the RF power supply and the argon fraction in the precursor gas are properly controlled, it is possible to control the hydrophobic properties and achieve an improved thin film.

The gas diffusion layer formed in the above-described manner is stacked with a membrane-electrode assembly (MEA), a separator with flow fields of reactant gas, a gasket to for maintaining hydrogen and airtightness, etc. to form a unit cell, and when these unit cells are repeatedly stacked, a polymer electrolyte membrane fuel cell can be manufactured.

The gas diffusion layer is attached to the outer surface of each of catalyst layers for the anode and cathode coated on both surfaces of the polymer electrolyte membrane in the fuel cell and, in the present invention, the above-described highly hydrophobic gas diffusion layer is used to manufacture a fuel cell with enhanced mass transfer.

Next, Examples of the present invention will be described in detail with reference to the drawings.

A process of forming a highly hydrophobic gas diffusion layer on the surfaces of a microporous layer and a macroporous substrate, which constitute the gas diffusion layer for a fuel cell, will be described in the following Examples, but the present invention is not limited thereto.

EXAMPLES

1. Manufacturing of Gas Diffusion Layers with Enhanced Hydrophobicity

First, a commercially available gas diffusion layer material, which includes a microporous layer comprising carbon powder and PTFE and a macroporous substrate comprising carbon fibers in the form of felt was used. While the gas diffusion layer material used had the macroporous substrate without PTFE hydrophobic treatment and the microporous layer with PTFE hydrophobic treatment, a commercially available gas diffusion layer material having a macroporous substrate comprising carbon fibers in the form of felt and PTFE may be applied to the present invention. The diameter of carbon particles to forming the microporous layer in the gas diffusion layer material is not uniform and lies in the range of 10 to 300 nanometers, and the carbon fibers forming the macroporous substrate are present in the range of 5 to 20 micrometers in diameter.

The surfaces of the microporous layer and the macroporous substrate of the prepared gas diffusion layer material were subjected to oxygen plasma etching using RF-PECVD, and the oxygen plasma etching was performed under conditions where only oxygen was used as gas, the etching pressure was 1 to 10 Pa, and the RF voltage was −100 Vb to −1,000 Vb.

The oxygen plasma reacts with the carbon materials to etch the carbon material on the surfaces of the microporous layer and the macroporous substrate and, at this time, the carbon materials are bonded with oxygen plasma to form $CO_2$ or $CO$, thus etching the surfaces of the microporous layer and the macroporous substrate.

Then, HMDSO comprising silicon and oxygen was coated on the surface of the carbon nanoprotrusions formed by the plasma etching to increase the hydrophobicity, thus forming a hydrophobic thin film.

The hydrophobic thin film was deposited using HMDSO by 13.56 MHz RF-PECVD on the surfaces of the microporous layer and the macroporous substrate, in which the fraction of argon gas in the precursor gas was maintained at 0 vol % and the RF power source was fixed to −400 Vb.

At this time, the thickness of the hydrophobic thin film might have a significant effect on the performance of the fuel cell.

As an example, when the surfaces of the microporous layer and the macroporous substrate etched by oxygen plasma are deposited with the HMDSO hydrophobic thin film for more than 1 minute, the thickness of the HMDSO hydrophobic thin film is increased to about 100 nanometers or higher. In this case, the gas diffusion layer has an electrical resistance of about 50 m$\Omega$cm$^2$ at a compression pressure of 1 MPa during a first compression, compared to the typical electrical resistance of about 12 m$\Omega$cm$^2$. Moreover, the cell voltage at 1,500 mA/cm$^2$ is significantly reduced by about 10% or higher in a normal operating condition where the stoichiometric ratio (anode/cathode) is 1.5/2.0.

As another example, when the surfaces of the microporous layer and the macroporous substrate etched by argon plasma are deposited with the HMDSO hydrophobic thin film for more than 1 minute, the thickness of the HMDSO hydrophobic thin film is increased to about 100 nanometers or higher. In this case, the electrical resistance of the gas diffusion layer is significantly increased to about 126 m$\Omega$cm$^2$, which is about 10 times the typical electrical resistance of about 12 m$\Omega$cm$^2$ at a compression pressure of 1 MPa during the first compression. Moreover, the cell voltage at 1,500 mA/cm$^2$ is significantly reduced by about 70% or higher in a normal operating condition where the stoichiometric ratio (anode/cathode) is 1.5/2.0, thus causing a catastrophic cell failure where the fuel cell does not operate any longer.

Therefore, in this Example, to provide an optimized thickness of the hydrophobic thin film, with which the hydrophobicity of the gas diffusion layer could increase and the increase in electrical resistance could be minimized, the HMDSO coating time was controlled to 10 seconds such that the hydrophobic thin film had a uniform thickness of about 10 nanometers at a chamber pressure of 5 Pa.

Figure 2:
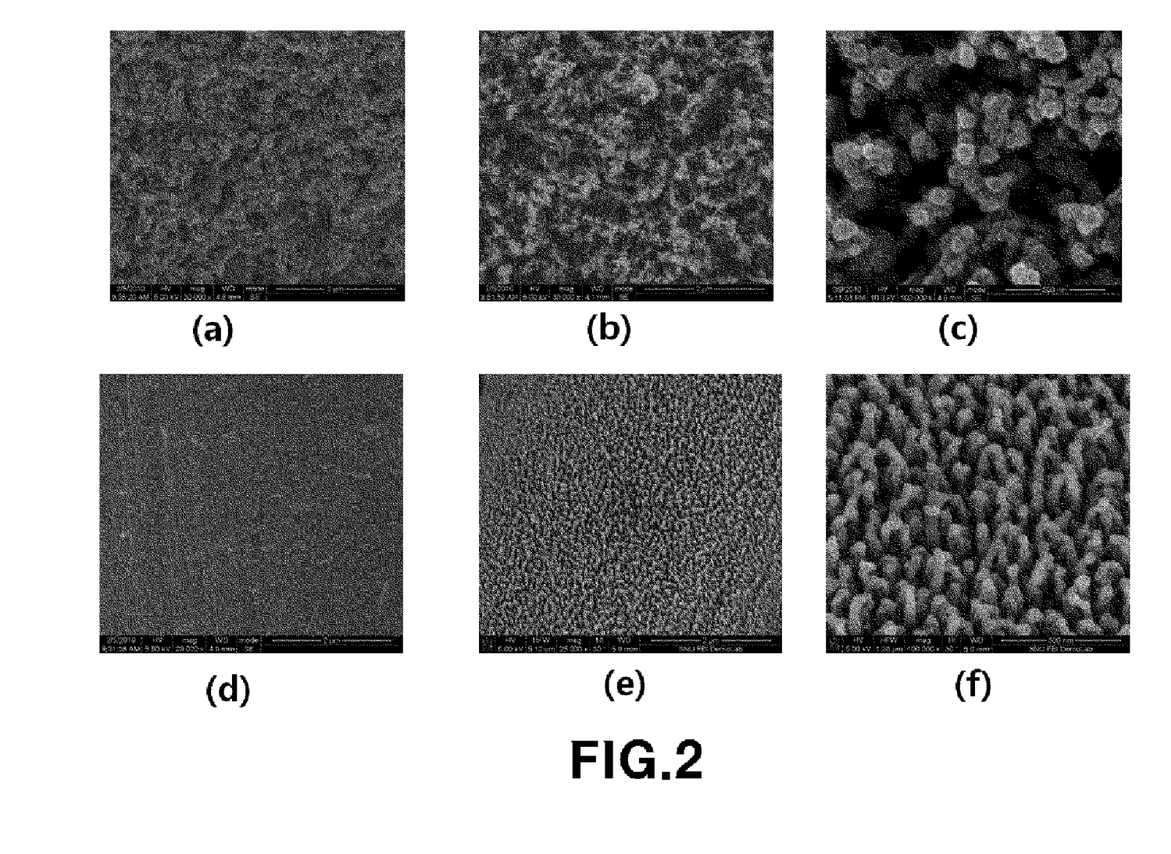
FIG. 2 is scanning electron microscope (SEM) images of the surfaces of gas diffusion layers (i.e., microporous layers and macroporous substrates) before and after oxygen plasma etching for forming a micro-nano dual structure on the surfaces of gas diffusion layers and after "oxygen plasma etching+hydrophobic carbon thin film (HMDSO) coating"

FIG. 2 is scanning electron microscope (SEM) images of the surfaces of gas diffusion layers (i.e., microporous layers and macroporous substrates) before and after oxygen plasma etching for forming a micro-nano dual structure on the surfaces of gas diffusion layers and after "oxygen plasma etching+hydrophobic carbon thin film (HMDSO) coating".

(a) is an SEM image at 30,000× magnification of a microporous layer of a gas diffusion layer material before surface treatment, and (b) and (c) are SEM images of microporous layers after surface treatment (etched by oxygen plasma for 5 minutes and coated with hydrophobic HMDSO for 10 seconds) in the Example of the present invention. Here, (b) is an image at 30,000× magnification, and (c) is an image at 100,000× magnification.

Moreover, (d) is an SEM image of a macroporous substrate of a gas diffusion layer material before surface treatment, and (e) and (f) are SEM images of macroporous substrates after surface treatment (etched by oxygen plasma for 5 minutes and coated with hydrophobic HMDSO for 10 seconds) in the Example of the present invention. Here, (e) is an image at 25,000× magnification, and (0 is an image at 100,000× magnification.

Referring to the SEM images of the gas diffusion layers before the surface treatment, the carbon particles of the microporous layer have non-uniform diameters and are agglomerated to form aggregates before the surface treatment. Thus, the carbon particles are present in the range of several tens of nanometers to several micrometers in diameter (see (a) of FIG. 2).

On the contrary, referring to the SEM images of the gas diffusion layers after the surface treatment, it can be seen that the diameter of the carbon particles is reduced to 10 to 50 nanometers to form nanoprotrusions, thus forming a micro-nano dual structure with a further roughened surface (see (b) and (c) of FIG. 2).

Moreover, when the surface of the macroporous substrate is etched by oxygen plasma for 5 minutes and coated with hydrophobic HMDSO for 10 seconds (see (e) and (f) of FIG. 2), compared to before the surface treatment (see (d) of FIG. 2), a roughness structure such as nanoprotrusions is formed on the surface of the carbon fibers. Here, the nanoprotrusions have a width of 10 to 30 nanometers and a length of 10 to 200 nanometers, providing an aspect ratio of about 1 to 7. Therefore, the carbon fibers having a diameter of 5 to 20 micrometers and the nanoprotrusions with a high aspect ratio formed thereon form a surface with a micro-nano dual structure. As a result, the surface with a micro-nano dual structure can be formed, and thus a surface structure having super-hydrophobic and self-cleaning properties can be completed.

2. Measurement of Contact Angles of Gas Diffusion Layers

The contact angle of the gas diffusion layer in the Example formed in the above manner was measured, and that of the gas diffusion layer material before surface treatment in a Comparative Example was also measured.

Moreover, to examine the change in contact angle of the gas diffusion layers according to oxygen plasma etching and HMDSO coating conditions, the contact angle of the gas diffusion layer in an additional Example etched by oxygen plasma for 5 minutes and coated with hydrophobic HMDSO for 5 or 10 seconds was also measured.

The measurement of the contact angle was performed using a goniometer (Data Physics Instrument GmbH, OCA 20L). This instrument makes it possible to acquire the optical image and contact angle of a sessile droplet on the surface. The contact angle (i.e., static contact angle) was measured by gently landing a 5 µl droplet on the surface. The "contact angle" used for convenience in the present invention means the "static contact angle".

Figure 3:
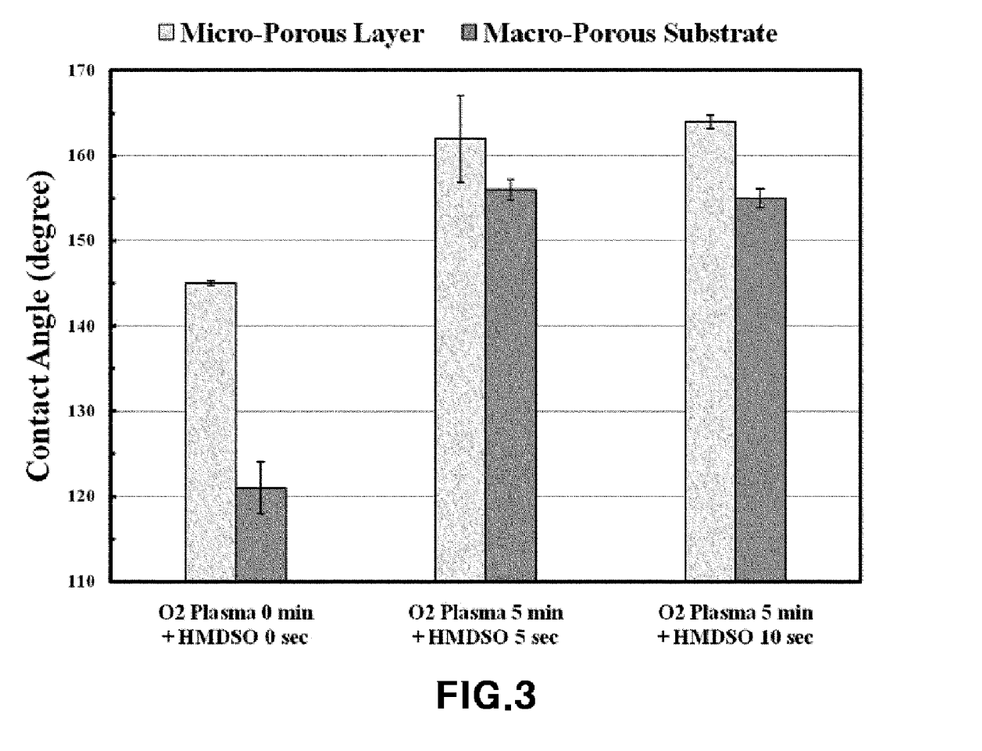
FIG. 3 is a graph illustrating changes in contact angle of gas diffusion layers according to the time of oxygen plasma etching for forming a micro-nano dual structure on the surfaces of a microporous layer and a macroporous substrate and hydrophobic carbon thin film (HMDSO) coating conditions.

FIG. 3 shows the changes in contact angle of the microporous layers and the macroporous substrates of the gas diffusion layers according to oxygen plasma etching and HMDSO coating conditions.

In the case of the gas diffusion layer without the surface treatment in the Comparative Example, the intrinsic contact angles of the microporous layer and the macroporous substrate are 145° and 121°, respectively.

However, in the case of the gas diffusion layer, whose microporous layer and macroporous substrate were all subjected to the surface treatment according to the Example of the present invention, the contact angle was significantly increased to 150° or higher, from which it can be seen that the super-hydrophobicity was exhibited.

That is, in the case of the surface treatment of oxygen plasma etching for 5 minutes and HMDSO coating for 5 seconds, the contact angles of the microporous layer and the macroporous substrate were increased to 162° and 156°, respectively, and in the case of the surface treatment of oxygen plasma etching for 5 minutes and HMDSO coating for 10 seconds, the contact angles of the microporous layer and the macroporous substrate were increased to 164° and 155°, respectively.

3. Measurement of Electrical Resistances of Gas Diffusion Layers

The electrical resistances of the gas diffusion layers in the Comparative Example (before surface treatment) and the Example (after surface treatment) according to the compression pressure were measured. At this time, a commercially available tester (Model: CPRT Tester, LCDV Co., Korea) was used to measure the changes in electrical resistance of all gas diffusion layer samples according to the compression pressure in first and second compression states.

Figure 4:
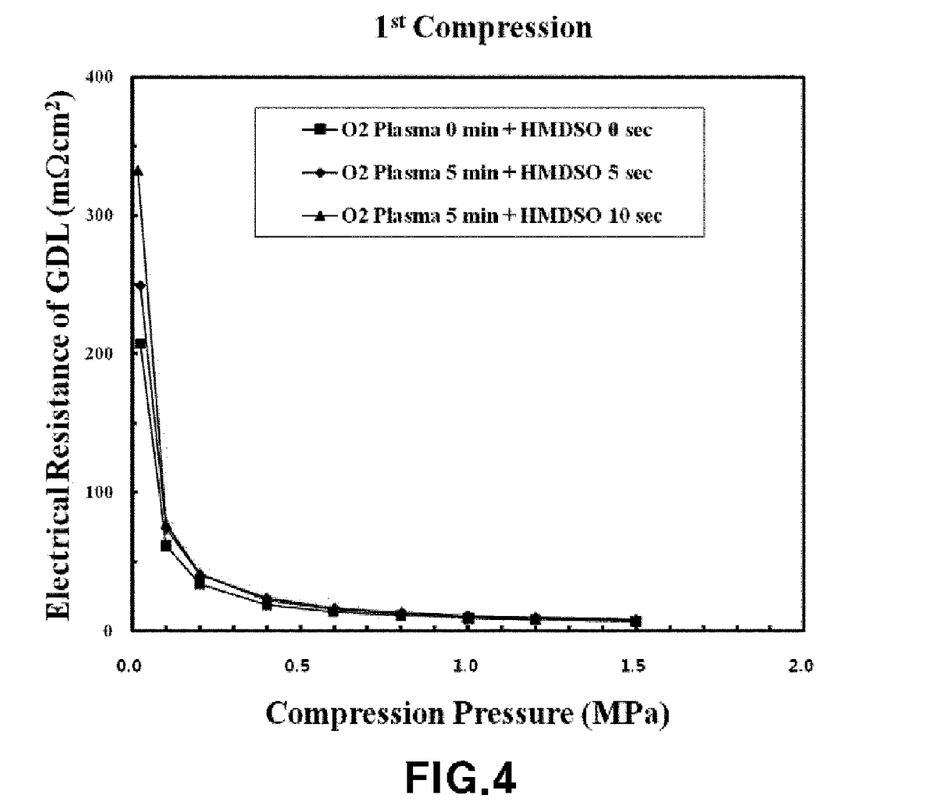
FIG. 4 is a graph illustrating changes in electrical resistance of gas diffusion layers according to the time of oxygen plasma etching for forming a micro-nano dual structure and hydrophobic carbon thin film (HMDSO) coating conditions during a first compression.

FIG. 4 is a graph illustrating the changes in electrical resistance of gas diffusion layer samples according to the time of oxygen plasma etching for forming a micro-nano dual structure and hydrophobic carbon thin film (HMDSO) coating conditions during the first compression. It is shown that the electrical resistance of the gas diffusion layer without the surface treatment in the Comparative Example is dramatically decreased with increasing the compression pressure. In the case of the gas diffusion layers in which the surfaces of the microporous layer and the macroporous substrate are all treated (i.e., oxygen plasma etching for 5 minutes+HMDSO coating for 5 seconds & oxygen plasma etching for 5 minutes+HMDSO coating for 10 seconds) in the Example, it is also observed that the electrical resistances are significantly decreased with increasing the compression pressure, which are similar to that of the gas diffusion layer without the surface treatment in the Comparative Example.

Figure 5:
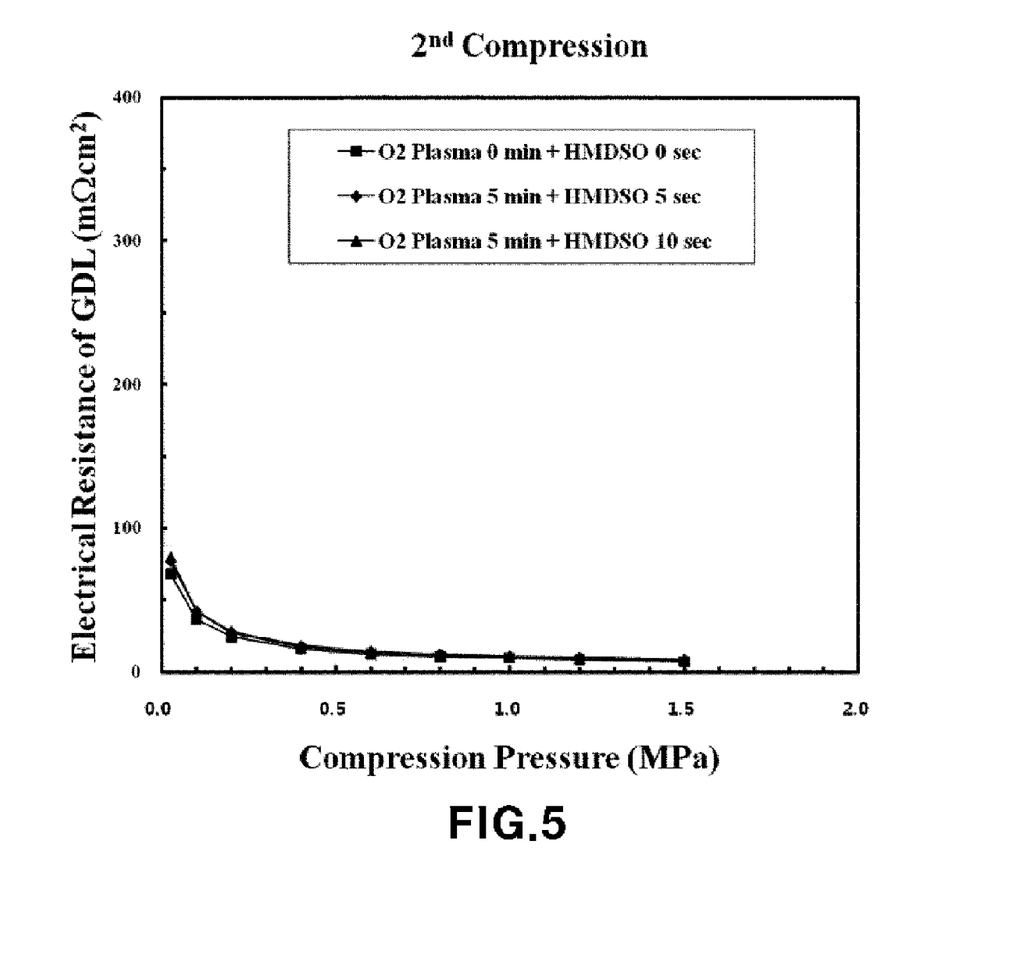
FIG. 5 is a graph illustrating changes in electrical resistance of gas diffusion layers according to the time of oxygen plasma etching for forming a micro-nano dual structure and to hydrophobic carbon thin film (HMDSO) coating conditions during a second compression.

FIG. 5 is a graph illustrating the changes in electrical resistance of gas diffusion layer samples according to the time of oxygen plasma etching for forming a micro-nano dual structure and hydrophobic carbon thin film (HMDSO) coating conditions during the second compression. In comparison with the results of the first compression in FIG. 4, it can be seen that the electrical resistance of the gas diffusion layer without the surface treatment in the Comparative Example is small even at the initial compression pressure of 0.03 MPa and then is reduced with increasing the compression pressure. In the case of the gas diffusion layers in which the surfaces of the microporous layer and the macroporous substrate are all treated (i.e., oxygen plasma etching for 5 minutes+HMDSO coating for 5 seconds & oxygen plasma etching for 5 minutes+HMDSO coating for 10 seconds) in the Example, it is also observed that the electrical resistances are small even at the initial compression pressure of 0.03 MPa and then is reduced with increasing the compression pressure, which are very similar to that of the gas diffusion layer without the surface treatment in the Comparative Example.

The above measurement results of the electrical resistance are shown to be suitable to for manufacturing the gas diffusion layer for the fuel cell since the oxygen plasma etching and HMDSO coating conditions of the Example can increase the surface contact angle, which increases the hydrophobicity, and can maintain the electrical resistance of the gas diffusion layer below 12 m$\Omega$cm$^2$ at a compression pressure of 1 MPa or higher, at which the unit cells are typically connected to each other.

4. Measurement of Fuel Cell Performance

Fuel cells were prepared using the gas diffusion layers according to the Example of the present invention and the Comparative Example and then the electrochemical performances were evaluated. That is, the fuel cells were prepared by attaching the gas diffusion layers according to the Example and the Comparative Example to the outer surfaces of the catalyst layers for the anode and cathode coated on both surfaces of the membrane-electrode assembly, and their performance was evaluated.

During the evaluation of the electrochemical performance of the fuel cells, current-voltage polarization characteristics of 25 cm$^2$ single fuel cells were measured and compared using a commercially available tester (Won-A Tech Co., Ltd., Korea).

At this time, the electrochemical performance of the fuel cell stacks with the gas diffusion layers according to the Example and the Comparative Example were evaluated under the following conditions:

Temperature at fuel cell inlet: 65° C.

Relative humidity of Hydrogen (anode)/Air (cathode): 100%/100%

Stoichiometric Ratio of Hydrogen (anode)/Air (cathode): 1.5/2.0 or 1.1/1.5

Figure 6:
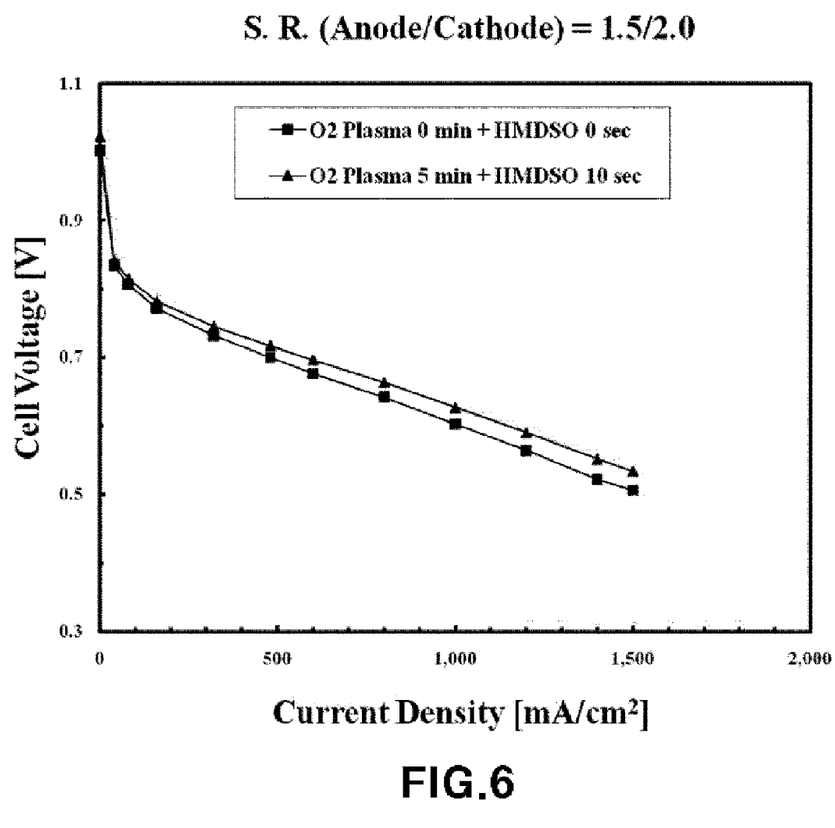
FIG. 6 is a graph illustrating changes in fuel cell performance before and after oxygen plasma etching for forming a micro-nano dual structure on gas diffusion layers and hydrophobic carbon thin film (HMDSO) coating in a condition where the stoichiometric ratio (anode/cathode) is 1.5/2.0.

FIG. 6 shows the changes in fuel cell performance before and after oxygen plasma etching and HMDSO coating in a condition where the stoichiometric ratio of reactant gases (anode/cathode) is 1.5/2.0.

The results of FIG. 6 shows the fuel cell performances measured in a condition where the stoichiometric ratio of reactant gases (anode/cathode) was 1.5/2.0, which is widely applied in a normal operating condition of a fuel cell vehicle.

It can be seen that, in all the current density range measured, the voltage of the fuel cell employing the gas diffusion layer (after the surface treatment such as oxygen plasma etching for 5 minutes+HMDSO coating for 10 seconds) in the Example is higher than that of the fuel cell employing the gas diffusion layer without the surface treatment in the Comparative Example.

As an example, at a high current density of 1,500 mA/$cm^2$, the cell voltages of the Comparative Example and the Example are 0.507 V and 0.534 V, respectively, from which it can be seen that the cell performance of the Example of the present invention is higher, about 5%.

Figure 7:
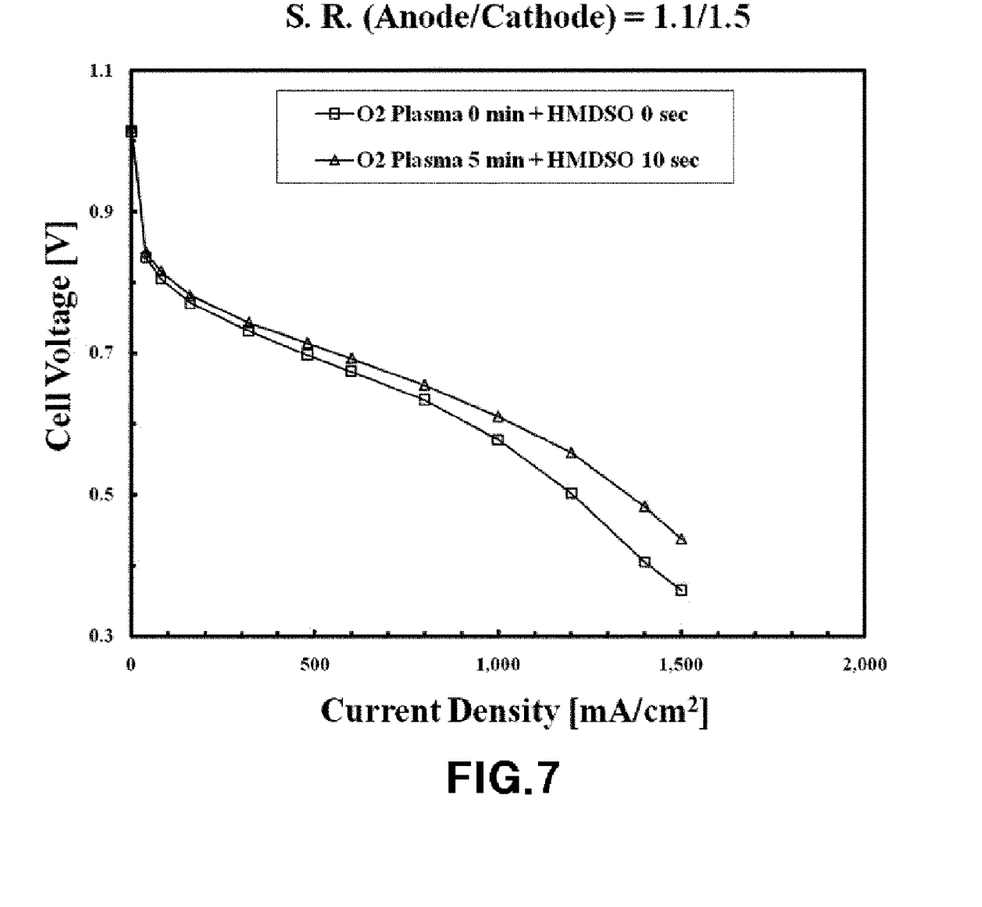
FIG. 7 is a graph illustrating changes in fuel cell performance before and after oxygen plasma etching for forming a micro-nano dual structure on gas diffusion layers and hydrophobic carbon thin film (HMDSO) coating in a condition where the stoichiometric ratio (anode/cathode) is 1.1/1.5.

FIG. 7 shows the changes in fuel cell performance before and after oxygen plasma etching and HMDSO coating in a condition where the stoichiometric ratio of reactant gases (anode/cathode) is 1.1/1.5.

The results of FIG. 7 are an example of evaluating the performance stability of the fuel cell in an abnormal operating condition of the fuel cell vehicle and measured in a condition where the stoichiometric ratio of reactant gases (anode/cathode) was 1.1/1.5, where the reactant gases such as hydrogen and air (oxygen) are not sufficiently supplied by unexpected external factors.

As such, it is very important to develop a fuel cell, in which the performance is maintained at its maximum and is not significantly reduced during reactant gas starvation, for the purpose of increasing the driving stability of the fuel cell vehicle.

Comparing the results of FIG. 7 with those of FIG. 6, the cell voltages were all reduced in the Comparative Example and the Example due to the low stoichiometric ratio of reactant gases. However, it can be seen that, in all the current density range measured, the voltage of the fuel cell employing the gas diffusion layer (after the surface treatment such as oxygen plasma etching for 5 minutes+HMDSO coating for 10 seconds) in the Example is higher than that of the fuel cell employing the gas diffusion layer without the surface treatment in the Comparative Example.

In particular, it can be seen that the difference increases at a high current density of 1,500 mA/$cm^2$ or higher. As an example, at a high current density of 1,500 mA/$cm^2$, the cell voltages of the Comparative Example and the Example are 0.365 V and 0.437 V, respectively, from which it can be seen that the cell performance of the Example of the present invention is higher, about 20%, and the performance of the fuel cell in the Example is relatively more stable.

In summary, it can be seen from the measurement results of the gas diffusion layer characteristics and the fuel cell performance that, due to the oxygen plasma etching and hydrophobic HMDSO thin film coating on the surface of the gas diffusion layer of the Example of the present invention, the hydrophobicity of the gas diffusion layer increases, the increase in electrical resistance is minimized, and the mass transfer characteristics are enhanced, thus exhibiting excellent cell performance.

As such, according to the manufacturing process of the present invention, it is possible to significantly improve the hydrophobic properties of the surfaces of the microporous layer and the macroporous substrate and to manufacture a highly hydrophobic gas diffusion layer.

Especially, when the process of improving the hydrophobic properties of the surfaces of the microporous layer and the macroporous substrate according to the present invention is used, it is possible to significantly improve the hydrophobic properties of the gas diffusion layer formed by the microporous layer and the macroporous substrate.

Moreover, when the above-described highly hydrophobic gas diffusion layer is used, it is possible to manufacture a fuel cell with enhanced mass transfer characteristics.

As described above, according to the fuel cell and the method for manufacturing the same in accordance with the present invention, it is possible to provide a fuel cell with excellent mass transfer characteristics using the gas diffusion layer that exhibits high hydrophobicity due to the nanostructures with a high aspect ratio and the hydrophobic thin film formed on the surfaces of the microporous layer and the macroporous substrate.

In particular, the contact angle significantly increases on the surface of the highly hydrophobic gas diffusion layer used in the fuel cell of the present invention, thus exhibiting super-hydrophobic surface properties. This super-hydrophobic surface has a self-cleaning function, which ejects a droplet from the surface. Thus, the fuel cell with enhanced mass transfer characteristics according to the present invention can efficiently discharge water produced during the electrochemical reaction, improving the overall cell performance.

Most of all, it is possible to improve the cell performance in a high power density region and in an abnormal operating condition, and thus it is possible to stably maintain the cell performance under abnormal operating conditions such as rapid acceleration/high speed driving of the fuel cell vehicle or during reactant gas starvation.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing a fuel cell with enhanced mass transfer characteristics, the method comprising:

providing a porous medium with a micrometer-scale surface roughness, wherein the porous medium includes a macroporous substrate containing carbon fibers and a microporous layer containing carbon particles;

forming a micro-nano dual structure on the surface of the porous medium with the micrometer-scale surface roughness by forming nanometer-scale protrusions and/or nanometer-scale collapsed pores by plasma etching, wherein the plasma etching is carried out on both the surface of the macroporous substrate and the surface of the microporous layer to form the micro-nano dual structure in which the nanometer-scale protrusions and/or the nanometer-scale collapsed pores are formed within surfaces of the carbon particles and/or within surfaces of the carbon fibers;

depositing a hydrophobic thin film on the surface of the micro-nano dual structure; and forming a fuel cell together with a membrane-electrode assembly and a separator using the porous medium including the micro-nano dual structure and the hydrophobic thin film as a gas diffusion layer.

2. The method of claim 1, wherein the plasma etching is performed on both sides of the porous medium.

3. The method of claim 1, wherein the plasma etching is performed in a plasma-enhanced chemical vapor deposition (PECVD) chamber.

4. The method of claim 1, wherein the plasma etching is performed in a plasma-enhanced chemical vapor deposition (PECVD) chamber using $O_2$, Ar, $N_2$, He, $CF_4$, HF, $C_2F_6$, $CHF_3$, or $SiF_4$.

5. The method of claim 1, wherein in the plasma etching, the size and shape of the nanoprotrusions or nanopores are controlled by adjusting at least one of the plasma irradiation time, acceleration voltage, and etching pressure.

6. The method of claim 5, wherein the acceleration voltage is adjusted to −100 Vb to −1,000 Vb and the etching pressure is adjusted to 1 Pa to 10 Pa.

7. The method of claim 1, wherein the plasma etching is performed by ion beam, or atmospheric plasma.

8. The method of claim 1, wherein in the deposition of the hydrophobic thin film, hexamethyldisiloxane gas is used.

9. The method of claim 1, wherein the hydrophobic thin film is a hydrocarbon thin film comprising silicon and oxygen or a hydrocarbon thin film comprising fluorine.

10. The method of claim 1, wherein the thickness of the hydrophobic thin film is set such that the gas diffusion layer has an electrical resistance of 12 mΩcm$^2$ or lower at a compression pressure of 1 MPa.

11. The method of claim 1, wherein the hydrophobic thin film has a thickness of 0.1 to 90 nanometers.

12. The method of claim 1, wherein the surface on which the hydrophobic thin film is formed has a static contact angle of 150° or higher with respect to pure water.

13. The method of claim 1, wherein the carbon particles are generally spherical particles prior to the plasma etching and wherein plasma etching is carried out to form the nanometer-scale protrusions and/or the nanometer-scale collapsed pores within surfaces of the carbon particles to provide sharp carbon particles.

14. The method of claim 1, wherein the carbon fibers have a diameter of about 5 to 20 μm prior to the plasma etching, and wherein the plasma etching is carried out to form nanometer-scale protrusions and/or nanometer-scale collapsed pores within surfaces of the carbon fibers having an aspect ratio of 1 to 7.

15. The method of claim 1, wherein the nanometer-scale protrusions and/or nanometer-scale collapsed pores have a width of about 10 to 30 nm and a length of about 10 to 200 nm.

16. The method of claim 1, wherein the plasma etching is carried out so as to control a surface shape of the nanometer-scale protrusions and/or the nanometer-scale collapsed pores within surfaces of the carbon particles and/or carbon fibers.

17. A method of manufacturing a fuel cell with enhanced mass transfer characteristics, the method comprising:

providing a porous medium with a micrometer-scale surface roughness, wherein the porous medium includes a macroporous substrate containing carbon fibers and a microporous layer containing carbon particles that is deposited on the macroporous substrate;

forming a micro-nano dual structure on the surface of the porous medium by forming nanometer-scale protrusions and/or nanometer-scale collapsed pores by plasma etching, wherein the plasma etching is carried out on both the surface of the macroporous substrate and the surface of the microporous layer to form the micro-nano dual structure in which the nanometer-scale protrusions and/or the nanometer-scale collapsed pores are formed within surfaces of the carbon particles;

depositing a hydrophobic thin film on the surface of the micro-nano dual structure; and forming a fuel cell together with a membrane-electrode assembly and a separator using the porous medium including the micro-nano dual structure and the hydrophobic thin film as a gas diffusion layer.

18. The method of claim 17, wherein the generally spherical particles have non-uniform sizes and are in the form of aggregates in the microporous layer ranging in size from about several tens to several hundreds of nanometers, and wherein plasma etching etches surfaces of the spherical carbon particles to form sharp carbon particles having a width of about 10 to 20 nm.

* * * * *